(12) United States Patent
Lee et al.

(10) Patent No.: US 10,044,247 B2
(45) Date of Patent: Aug. 7, 2018

(54) DRIVING MODULE FOR VEHICLES

(71) Applicant: LG Electronics Inc., Seoul (KR)

(72) Inventors: Junggu Lee, Seoul (KR); Wonrak Bae, Seoul (KR); Junyoung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 14/835,404

(22) Filed: Aug. 25, 2015

(65) Prior Publication Data
US 2016/0065038 A1  Mar. 3, 2016

(30) Foreign Application Priority Data

Aug. 26, 2014  (KR) .................. 10-2014-0111585

(51) Int. Cl.
| | | |
|---|---|---|
| H02K 11/00 | (2016.01) |
| B60K 6/22 | (2007.10) |
| B60W 10/30 | (2006.01) |
| B60W 20/00 | (2016.01) |
| B60L 11/18 | (2006.01) |
| H02K 9/19 | (2006.01) |
| B60K 1/00 | (2006.01) |

(52) U.S. Cl.
CPC ............ *H02K 11/0073* (2013.01); *B60K 1/00* (2013.01); *B60K 6/22* (2013.01); *B60L 11/1814* (2013.01); *B60W 10/30* (2013.01); *B60W 20/00* (2013.01); *H02K 9/19* (2013.01); *B60K 2001/003* (2013.01); *B60K 2001/006* (2013.01); *Y10S 903/93* (2013.01)

(58) Field of Classification Search
CPC .................................................. H02K 11/0073
USPC ....................................................... 318/139, 34
See application file for complete search history.

(56) References Cited

U.S. PATENT DOCUMENTS

| | | | |
|---|---|---|---|
| 7,352,154 B2 * | 4/2008 | Cook | H02J 1/00 320/116 |
| 8,662,222 B1 | 3/2014 | Lee et al. | |
| 8,723,457 B2 * | 5/2014 | Komatsu | B60W 10/28 180/65.1 |
| 8,937,400 B2 * | 1/2015 | Obayashi | B60L 1/003 180/65.21 |

(Continued)

FOREIGN PATENT DOCUMENTS

| | | |
|---|---|---|
| CN | 101573860 A | 11/2009 |
| CN | 103129364 A | 6/2013 |

(Continued)

*Primary Examiner* — David S Luo
(74) *Attorney, Agent, or Firm* — Birch, Stewart, Kolasch & Birch, LLP

(57) ABSTRACT

A driving module for vehicles includes a vehicle driving motor, a case configured to accommodate the vehicle driving motor and a gear device transmitting rotary force of the vehicle driving motor to axles, a vehicle interior air conditioning compressor mounted on the case, and an integrated control module mounted on the case and including a first power conversion device to drive the vehicle driving motor and a second power conversion device to drive the vehicle interior air conditioning compressor, the first and second power conversion devices being integrated into the integrated control module, thus having a compact and light-weight structure and minimizing the number of parts.

19 Claims, 11 Drawing Sheets

(56) References Cited

U.S. PATENT DOCUMENTS

2006/0097670 A1  5/2006 Fukasaku et al.
2014/0090908 A1  4/2014 Amano et al.

FOREIGN PATENT DOCUMENTS

| CN | 103481788 A | 1/2014 |
|---|---|---|
| DE | 10 2009 015 414 A1 | 9/2010 |
| DE | 10 2011 016 624 A1 | 10/2012 |
| DE | 10 2012 025 371 A | 7/2014 |
| EP | 2 117 106 A1 | 11/2009 |
| JP | 5277360 B1 | 8/2013 |
| KR | 10-2009-0062326 A | 6/2009 |
| KR | 10-2013-0078106 A | 7/2013 |
| KR | 10-2014-0050159 A | 4/2014 |

\* cited by examiner

DRIVING MODULE FOR VEHICLES

CROSS-REFERENCE TO RELATED APPLICATION

This application claims the benefit of Korean Patent Application No. 10-2014-0111585, filed on Aug. 26, 2014 in the Korean Intellectual Property Office, the disclosure of which is incorporated herein by reference.

BACKGROUND OF THE INVENTION

1. Field of the Invention

The present invention relates to a driving module for a vehicle and, more particularly, to a driving module for a vehicle which generates a driving force to drive a vehicle.

2. Description of the Related Art

In general, a vehicle may be divided into a body forming the external appearance of the vehicle and a chassis to which various devices are connected.

The chassis includes main devices including a driving source generating driving force to drive the vehicle, such as an engine or a motor, a power transmission device, a steering device, a suspension device, a braking device and the like.

Combustion engines are mainly used as driving sources installed in vehicles. Among combustion engines, a combustion engine using a volatile fuel compresses the fuel under the condition that the fuel is well mixed with oxygen in the air so as to achieve complete combustion and then obtains kinematic energy directly using heat energy generated during combustion. Such a combustion engine using a volatile fuel causes depletion of petroleum resources and environmental pollution due to exhaust gas and thus, electric vehicles have been highlighted as a substitute for combustion engines.

An electric vehicle, which does not use petroleum fuel and an engine and is driven by rotating a vehicle driving motor using electricity accumulated in a battery, may be a pollution-free vehicle not causing exhaust gas.

Further, a refrigerating cycle device including a vehicle interior air conditioning compressor, a condenser, an expansion unit and an evaporator may be installed in a vehicle to cool or heat the interior of the vehicle.

The vehicle interior air conditioning compressor compresses a refrigerant and, in the case of an electric vehicle, may be installed separately from a vehicle driving motor. The vehicle interior air conditioning compressor may be installed at a position separated from the vehicle driving motor for prevention of vibration or service and a space may be formed between the vehicle interior air conditioning compressor and the vehicle driving motor.

In a conventional vehicle, a vehicle interior air conditioning compressor and a vehicle driving motor are separately installed and thus space utilization in the interior of the vehicle is low and an assembly process of the vehicle is complicated.

SUMMARY OF THE INVENTION

An object of the present invention is to provide a driving module for vehicles which may be compact and increase space utilization.

To achieve the above objects, there is provided a driving module for vehicles including a vehicle driving motor, a case configured to accommodate the vehicle driving motor and a gear device transmitting rotary force of the vehicle driving motor to axles, a vehicle interior air conditioning compressor mounted on the case, and an integrated control module mounted on the case and including a first power conversion device to drive the vehicle driving motor and a second power conversion device to drive the vehicle interior air conditioning compressor, the first and second power conversion devices being integrated into the integrated control module.

The integrated control module further may include a third power conversion device to charge a high voltage battery of a vehicle.

The integrated control module may further include a fourth power conversion device to charge a low voltage battery of the vehicle through the high voltage battery.

A power conversion circuit unit of the third power conversion device may be connected to at least one of the first power conversion device, the second power conversion device and the fourth power conversion device and is usable during driving of the vehicle.

The power conversion circuit unit of the third power conversion device may be preferentially connected to the fourth power conversion device from among the first power conversion device, the second power conversion device and the fourth power conversion device.

At least one of the first power conversion device, the second power conversion device and the fourth power conversion device may be disposed adjacent to the third power conversion device.

Heating part receipt boards of the first power conversion device, the second power conversion device, the third power conversion device and the fourth power conversion device may be disposed on one cooling module.

The driving module for vehicles may further include a heat exchanger in which cooling water, having cooled at least one of the cooling module and the vehicle driving motor, absorbs heat from a refrigerant compressed by the vehicle interior air conditioning compressor, and the heat exchanger may be mounted on at least one of the vehicle driving motor, the case, and the cooling module.

The cooling module may include a cooling module cooling channel through which the cooling water passes, the vehicle driving motor may include a motor cooling channel through which the cooling water passes, the cooling module cooling channel and the motor cooling channel may be connected by a cooling module-motor connection channel, the driving module for vehicles may further include a heat exchanger in which the cooling water, having cooled the cooling module cooling channel and the motor cooling channel, exchanges heat with the refrigerant compressed by the vehicle interior air conditioning compressor, and the heat exchanger may be connected to a radiation unit to radiate heat from the cooling water having exchanged heat with the refrigerant.

Each of the first power conversion device, the second power conversion device, the third power conversion device and the fourth power conversion device may include a control board to control the heating part receipt boards thereof, and the integrated control module may further include a central processing unit (CPU) to perform integrated control of the control boards of the first power conversion device, the second power conversion device, the third power conversion device and the fourth power conversion device.

The heating part receipt boards may be seated on the cooling module, the control boards may be disposed above the heating part receipt boards, and the CPU may be disposed above the control boards.

The integrated control module may further include a central processing unit (CPU) to perform integrated control of the first power conversion device, the second power conversion device, the third power conversion device and the fourth power conversion device, and wherein the CPU may be disposed above at least one of the first power conversion device, the second power conversion device, the third power conversion device and the fourth power conversion device.

The first power conversion device may have a plurality of phases and include boards prepared in the same number as the phases so as to correspond to phase shift of the respective phases.

The driving module for vehicles may further include a first compressor holder mounted on the case and configured to restrict vertical movement of the vehicle interior air conditioning compressor and a second compressor holder mounted on the case and configured to restrict horizontal movement of the vehicle interior air conditioning compressor.

The driving module for vehicles may further include elastic members configured to prevent damage to the vehicle interior air conditioning compressor or to reduce vibration and noise.

At least one of the first compressor holder and the second compressor holder may be formed of an elastic material.

At least one of the first compressor holder and the second compressor holder may be formed of a metal and the driving module for vehicles may further include a case elastic member disposed between the holder formed of a metal and the case.

Fixing units configured to fix the integrated control module may be formed on the vehicle driving motor, and integrated control module elastic members may be disposed between the fixing units and the integrated control module.

The integrated control module may be disposed on the vehicle driving motor, the case may include an integrated control module case configured to protect the integrated control module, and the integrated control module case may include one or more conductor layers having a thickness of 10 nm to 3 mm formed on at least one of the inner surface and outer surface of the integrated control module case so that the integrated control module case may have electromagnetic wave absorption and shielding performance corresponding to the plural power conversion devices, and a sound absorbent and/or a sound insulation material layer having a greater thickness than the conductor layers.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described with reference to the accompanying drawings.

Figure 1:
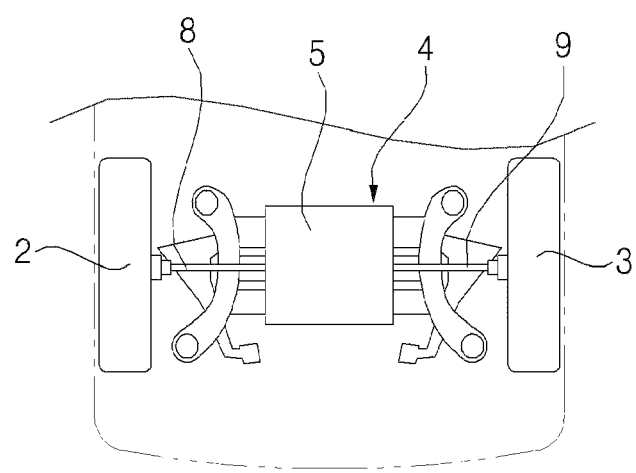
FIG. 1 is a plan view schematically illustrating the configuration of a main portion of a driving module for vehicles in accordance with one embodiment of the present invention, when the driving module for vehicles is installed in a vehicle.
Figure 2:
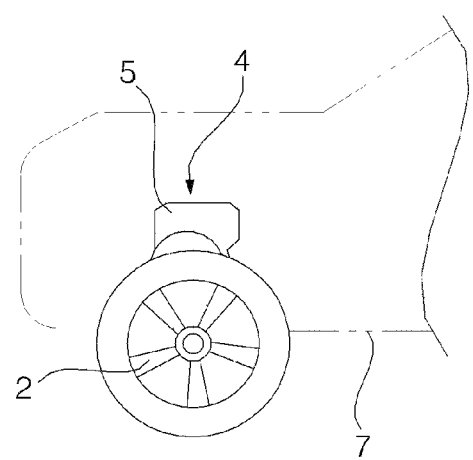
FIG. 2 is a side view schematically illustrating the driving module for vehicles in accordance with the embodiment of the present invention.
Figure 3:
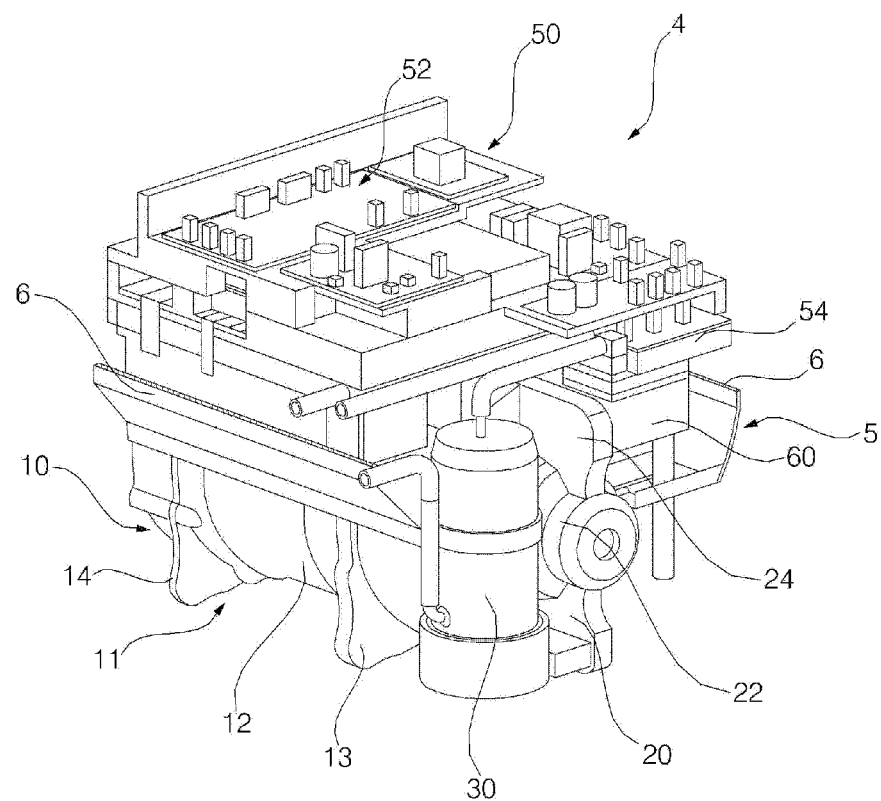
FIG. 3 is a partially exploded perspective view illustrating the inside of the driving module for vehicles in accordance with the embodiment of the present invention.
Figure 4:
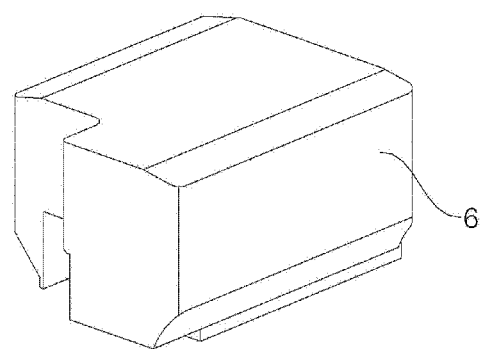
FIG. 4 is a perspective view illustrating an integrated control module case of the driving module for vehicles in accordance with the embodiment of the present invention.
Figure 5:
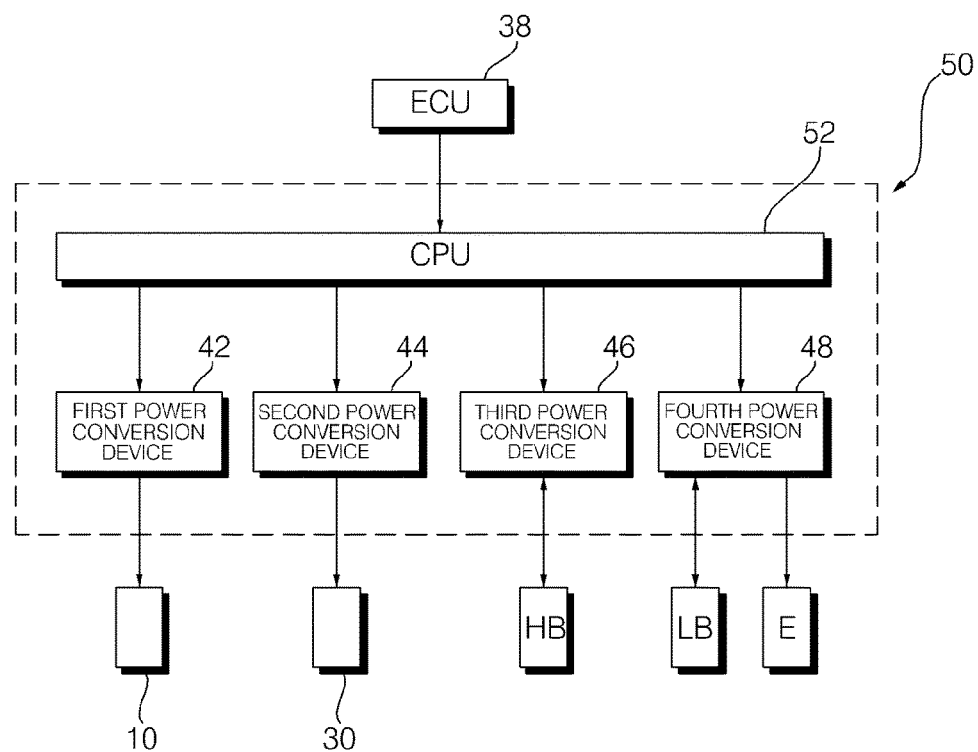
FIG. 5 is a control block diagram of the driving module for vehicles in accordance with the embodiment of the present invention.

FIG. 1 is a plan view schematically illustrating the configuration of a main portion of a driving module for vehicles in accordance with one embodiment of the present invention, when the driving module for vehicles is installed in a vehicle. FIG. 2 is a side view schematically illustrating the driving module for vehicles in accordance with the embodiment of the present invention. FIG. 3 is a partially exploded perspective view illustrating the inside of the driving module for vehicles in accordance with the embodiment of the present invention. FIG. 4 is a perspective view illustrating an integrated control module case of the driving module for vehicles in accordance with the embodiment of the present invention. FIG. 5 is a control block diagram of the driving module for vehicles in accordance with the embodiment of the present invention.

A driving module 4 may be mounted in a vehicle and rotate vehicle wheels 2 and 3. The vehicle in which the driving module 4 is mounted may include the vehicle wheels 2 and 3, a high voltage battery HB, and a low voltage battery LB.

The vehicle wheels 2 and 3 may be connected to the driving module 4 and rotated by the driving module 4.

The high voltage battery HB may be installed on a vehicle body 7 and supply electric energy to the driving module 4. The high voltage battery HB may have a higher charging voltage than the low voltage battery LB and, for example, have a charging voltage of 40V to 60V. The high voltage battery HB may be a main battery installed in the vehicle.

The low voltage battery LB may be installed on a vehicle body 7 and have a lower charging voltage than the high voltage battery HB and, for example, be a battery of 10V to 25V. The low voltage battery LB may supply electric energy to electronic parts E installed in the vehicle, for example, an audio unit, a display and/or various switches. The low voltage battery LB may be a sub battery charged by the high voltage battery HB.

The driving module 4 may rotate the vehicle wheels 2 and 3 using electric energy of the high voltage battery HB. The vehicle in which the driving module 4 is installed may be an electric vehicle driven by electricity of the high voltage battery HB. Further, the driving module 4 may be applied to a vehicle in which a combustion engine is installed.

The driving module 4 may be installed on the vehicle body 7. The driving module 4 may be installed such that at least a part of the driving module 4 is located between the vehicle wheels 2 and 3. The driving module 4 may rotate the vehicle wheels 2 and 3 by connecting axles 8 and 9 to the vehicle wheels 2 and 3.

The driving module 4 may include a vehicle driving motor 10 driven by electric energy of the high voltage battery HB.

The vehicle driving motor 10 may be a driving source generating torque to rotate the vehicle wheels 2 and 3. The vehicle driving motor 10 may be a traction motor generating driving force to rotate the vehicle wheels 2 and 3.

The vehicle driving motor 10 may be 3-phase AC motor. The vehicle driving motor 10 may be a field winding wire type motor which includes a U-phase winding wire, a V-phase winding wire and a W-phase winding wire arranged at a phase difference of 120 degrees and is driven by 3-phase AC power.

The driving module 4 may include a motor case 11. The motor case 11 may form the external appearance of the vehicle driving motor 10.

The motor case 11 may include a motor housing 12 forming an inner space in which a rotor and a stator are located. The motor housing 12 may be formed in a hollow shape. An opening may be formed on each of the left surface and right surface of the motor housing 12.

The motor case 11 may further include a first side cover 13 disposed on one of the left and right sides of the motor housing 12. The motor case 11 may further include a second side cover 14 disposed on the other of the left and right sides of the motor housing 12.

The vehicle driving motor 10 may include a stator 15 (with reference to FIG. 11) installed within the motor case 11 and a rotor (not shown) rotatably installed within the stator 15. A motor shaft may be installed on the rotor (not shown) of the vehicle driving motor 10. The motor shaft may be a hollow shaft.

The driving module 4 may reduce rotary force of the vehicle driving motor 10 and then transmit the reduced rotary force to a gear device. The gear device may transmit the rotary force of the vehicle driving motor 10 to the axles 8 and 9. The gear device may be connected to the hollow shaft of the vehicle driving motor 10. The gear device may be connected to the axles 8 and 9. When the vehicle driving motor 10 is driven, the gear device may rotate the axles 8 and 9 and the vehicle wheels 2 and 3 may be rotated by the axles 8 and 9.

The gear device may include a reduction gear device operated by the hollow shaft of the vehicle driving motor 10. The reduction gear device may include a driving gear installed on the hollow shaft of the vehicle driving motor 10, a counter shaft disposed in parallel with the hollow shaft, a counter gear installed on the counter shaft and engaged with the driving gear, and a driven gear installed on the counter shaft and having a different gear ratio from the counter gear.

The gear device may include a differential gear device connected to the axles 8 and 9 and rotating the axles 8 and 9. In the differential gear device, a side gear may be connected to the axles 8 and 9, and rotary force transmitted to a differential gear may be transmitted to the axles 8 and 9 through the side gear.

The axles 8 and 9 may include a first axle 8 connected to a first vehicle wheel 2 and a second axle 9 connected to a second vehicle wheel 3. One of the first axle 8 and the second axle 9 may pass through the hollow shaft of the vehicle driving motor 10.

The driving module 4 may include a case 5 to accommodate the gear device and the vehicle driving motor 10.

The case 5 may include an integrated control module case 6 to protect an integrated control module 50, which will be described later. The integrated control module case 6 may be installed to surround at least a part of the vehicle driving motor 10 and the integrated control module 50. The integrated control module case 6 may be disposed to surround the upper portion of the vehicle driving motor 10.

The case 5 may include a gear box 20 to accommodate the gear device. The gear box 20 may be a frame in which the gear box is installed, and protect the gear device installed therein. The gear box 20 may be installed on the vehicle driving motor 10. The gear box 20 may be installed at the side of the vehicle driving motor 10 and be integrated with the vehicle driving motor 10. The gear box 20 may be mounted on the vehicle body 7 under the condition that the gear box 20 is mounted on the vehicle driving motor 10, thus being capable of improving assembly efficiency and serviceability. The gear box 20 may include a differential gear device case 22 surrounding the differential gear device, and a part of the differential gear device case 22 may protrude in one direction of the leftward and rightward directions.

The driving module 4 may have a maximally compact structure, the number of parts of the driving module 4 may be minimized, and parts of the driving module 4 which are commonly usable may be maximally commonly used.

The driving module 4 may include a vehicle interior air conditioning compressor 30. The compressor 30 is a part of a refrigerating cycle device to cool or heat the interior of the vehicle, and may suck a refrigerant, compress the sucked refrigerant and then discharge the compressed refrigerant. The compressor 30 may include a compression unit having a compression chamber to compress the refrigerant and a motor unit to operate the compression unit. The compressor 30 and the refrigerating cycle device will be described later.

The compressor 30 may be mounted on at least one of the vehicle driving motor 10 and the case 4. The compressor 30 may be mounted on at least one of the motor case 11, the integrated control module case 6 and the gear box 20. The vehicle driving motor 10, the gear box 20 and the compressor 30 may be integrated and constitute the driving module 4.

The compressor 30 may be installed on the gear box 20 and, in this case, the compressor 30 may also be installed on the frame of the vehicle body 7. The compressor 30 may be located at the circumference of the differential gear device case 22. The compressor 30 may be installed on the differential gear device case 22 of the gear box 20. The compressor 30 may be installed at the side of the vehicle driving motor 10. The compressor 30 may be located in front of or at the rear of the differential gear device case 22.

If the compressor 30 is installed separately from the driving module 4, the compressor 30 occupies a separate space in the vehicle. However, if the compressor 30 is mounted on the vehicle driving motor 10 or the gear box 20, the compressor 30 may become a part of the driving module 4 and, in this case, the compact structure of the vehicle may be acquired.

The vehicle in which the driving module 4 is mounted may include an electronic control unit (ECU) to control the driving module 4, with reference to FIG. 5.

The ECU 38 may be electrically connected to the integrated control module 50, which will be described later, and transmit and receive signals to and from the integrated control module 50. The ECU 38 may be an electronic control device to control a braking system, a steering system and the like installed in the vehicle as well as the driving module 4.

The driving module 4 may include the integrated control module 50. The integrated control module 50 may include a first power conversion device 42 to drive the vehicle driving motor 10 and a second power conversion device 44 to drive the compressor 30, and the first power conversion device 42 and the second power conversion device may be integrated into one integrated control module 50.

The integrated control module 50 may further include a third power conversion device 46 to charge the high voltage battery HB of the vehicle.

The integrated control module 50 may further include a fourth power conversion device 48 to charge the low voltage battery LB through the high voltage battery HB.

The first power conversion device 42 may include a circuit unit to control the RPM of the vehicle driving motor 10. The first power conversion device 42 may include a motor inverter to control the vehicle driving motor 10. The first power conversion device 42 may control the RPM of the vehicle driving motor 10 by changing voltage and frequency applied to the vehicle driving motor 10.

The second power conversion device 44 may include a circuit unit to control the RPM of the compressor 30. The second power conversion device 44 may include a compressor inverter to control the compressor 30. The second power conversion device 44 may control the RPM of the compressor 30 by changing voltage and frequency applied to the compressor 30.

The third power conversion device 46 may include a power conversion circuit unit to charge the high voltage battery HB with power supplied through an external socket, i.e., an On Board Charger (OBC). The power conversion circuit unit of the third power conversion device 46 may charge the high voltage battery HB with power supplied through the external socket when the vehicle is stopped.

The fourth power conversion device 48 may include a Low-voltage DC Converter (LDC) to receive voltage from the high voltage battery HB, to charge the low voltage battery LB with the received voltage, and to supply necessary voltage to an electronic part E. The fourth power conversion device 48 converts voltage of the low voltage battery LB into voltage necessary for the electronic part E and supplies the converted voltage to the electronic part E when the vehicle is started up.

The integrated control module 50 may further include a central processing unit (CPU) 52. The CPU 52 may perform integrated control of the first power conversion device 42, the second power conversion device 44, the third power conversion device 46 and the fourth power conversion device 48. A single CPU 52 may be installed. The CPU 52 may be electrically connected to the ECU 38. The CPU 52 may be electrically connected to the first power conversion device 42, the second power conversion device 44, the third power conversion device 46 and the fourth power conversion device 48, respectively. In this case, the number of parts of the driving module 4 may be minimized and the driving module 4 may be compact, as compared to the case in that respective CPUs of the first power conversion device 42, the second power conversion device 44, the third power conversion device 46 and the fourth power conversion device 48 are installed in the driving module 4 and the respective CPUs are connected to the ECU 38. The CPU 52 may be disposed above at least one of the first power conversion device 42, the second power conversion device 44, the third power conversion device 46 and the fourth power conversion device 48.

The power conversion circuit unit (for example, the inverter circuit unit) of the third power conversion device 46 may be connected to at least one of the first power conversion device 42, the second power conversion device 44 and the fourth power conversion device 48, and be used during driving of the vehicle. That is, the power conversion circuit unit of the third power conversion device 46 may be used during driving of the vehicle as well as during stoppage of the vehicle.

In this case, a power conversion device connected to the power conversion circuit unit of the third power conversion device 46 may convert power using the power conversion circuit unit of the third power conversion device 46 and be operated without a separate power conversion circuit unit. For example, the fourth power conversion device 48 may function using the power conversion circuit unit of the third power conversion device 46 and, in this case, the first power conversion unit 42 may autonomously perform a function of driving the driving motor 10 for vehicles. That is, the first power conversion device 42 does not need to stop performance of the function thereof to perform the function of the fourth power conversion device 48.

As described above, if the power conversion circuit unit of the third power conversion device 46 is used commonly, the number of power conversion circuit units installed in the integrated control module 50 may be minimized, and the configuration of the integrated control module 50 may be further simplified. The power conversion circuit unit of the third power conversion device 46 has priority to connect to the fourth power conversion device 48 among the first power conversion device 42, the second power conversion device 44 and the fourth power conversion device 48.

At least one of the first power conversion device 42, the second power conversion device 44 and the fourth power conversion device 48 may be disposed adjacent to the third power conversion device 46, and the power conversion device disposed adjacent to the third power conversion device 46 may convert power using the power conversion circuit unit of the third power conversion device 46.

The first power conversion device 42, the second power conversion device 44, the third power conversion device 46 and the fourth power conversion device 48 may be cooled by one cooling module 54. The first power conversion device 42, the second power conversion device 44, the third power conversion device 46 and the fourth power conversion device 48 may be mounted on one cooling module 54.

Here, the cooling module 54 may be a cooling plate to radiate heat generated from the integrated control module 50 using cooling water or a refrigerant. The cooling module 54 may be provided with a cooling channel formed therein, through which the cooling water or the refrigerant may pass, and cool the first power conversion device 42, the second power conversion device 44, the third power conversion device 46 and the fourth power conversion device 48 mounted thereon through a conductive method. The cooling module 54 may be mounted on at least one of the vehicle driving motor 10 and the gear box 20.

The integrated control module 50 may be mounted on the case 5 or the vehicle driving motor 10 and constitute a part of the driving module 4. The integrated control module 50 may be mounted on the vehicle driving motor 10 and be integrated with the case 5, the vehicle driving motor 10 and the compressor 30. The case 5, the vehicle driving motor 10, the compressor 30 and the integrated control module 50 may constitute the driving module 4. The integrated control module 50 may be mounted on the vehicle body 7 or separated from the vehicle body 7 under the condition that the integrated control module 50 is mounted on the case 5 or the vehicle driving motor 10 and the gear box 20.

The integrated control module 50 may be located above the upper surface of the vehicle driving motor 10. A part of the integrated control module 50 may be located above the upper surface of the gear box 20. The integrated control module 50 may be installed such that the cooling module 54 is located above the upper surface of the vehicle driving motor 10, and the first power conversion device 42, the second power conversion device 44, the third power conversion device 46 and the fourth power conversion device 48 are disposed on the cooling module 54.

The driving module 4 may further include a heat exchanger 60 to exchange heat between cooling water and the refrigerant.

The heat exchanger 60 may be a heat exchanger in which cooling water, having cooled at least one of the cooling module 54 and the vehicle driving motor 10, absorbs heat from the refrigerant compressed by the compressor 30. The heat exchanger 60 may function as a condenser which condenses the refrigerant compressed by the compressor 30 by radiating heat from the refrigerant to the cooling water. The heat exchanger 60 may be a refrigerant-cooling water heat exchanger in which a refrigerant channel and a cooling water channel are formed. The heat exchanger 60 may be a plate-type heat exchanger in which a plate-type heat transfer member is located between a refrigerant channel and a cooling water channel.

The heat exchanger 60 may be mounted on at least one of the vehicle driving motor 10, the case 5 and the cooling module 54. The vehicle driving motor 10, the gear box 20, the integrated control module 50 and the heat exchanger 60 may be integrated and constitute the driving module 4. The vehicle driving motor 10, the gear box 20, the compressor 30, the integrated control module 50 and the heat exchanger 60 may be integrated and constitute the driving module for vehicles.

If the heat exchanger 60 is mounted on the case 5, the heat exchanger 60 may be mounted on the gear box 20. The heat exchanger 60 may be mounted on at least one of the integrated control module 50 and the gear box 20. The heat exchanger 60 may be located below the integrated control module 20. The heat exchanger 60 may be located around the differential gear device case 22. The heat exchanger 60 may be formed in a plate type and installed below the cooling module 54. The heat exchanger 60 may be located below the integrated control module 50 and at the side of the gear box 20. The heat exchanger 60 may be mounted below the cooling module 54.

The heat exchanger 60 may be separated from the compressor 30 under the condition that a part of the gear box 20 is located between the heat exchanger 60 and the compressor 30. A protrusion 24 of the gear box 20 may protrude in the sideward direction from a position above the differential gear device case 22. The protrusion 24 may protrude between the upper portion of the compressor 30 and the heat exchanger 60. If the heat exchanger 60 is located in front of the protrusion 24, the upper portion of the compressor 30 may be located at the rear of the protrusion 24. If the heat exchanger 60 is located at the rear of the protrusion 24, the upper portion of the compressor 30 may be located in front of the protrusion 24.

Further, if the compressor 30 is mounted separately from the vehicle driving motor 10 and the gear box 20, and if the first power conversion device 42, the second power conversion device 44, the third power conversion device 46 and the fourth power conversion device 48 are independently installed, differently from the present invention, these components may occupy a total of 150 Liters of space.

However, if the first power conversion device 42, the second power conversion device 44, the third power conversion device 46 and the fourth power conversion device 48 constitutes one integrated control module 50, and if the integrated control module 50, the compressor 30, the vehicle driving motor 10 and the gear box 20 constitute one driving module 4, as in the present invention, the driving module 4 may occupy a total of 60 Liters of space.

That is, the above-described driving module 4 may serve as a driving system or a powertrain module to drive a vehicle, increase the space of the interior of the vehicle and simplify a vehicle manufacturing process.

Figure 6:
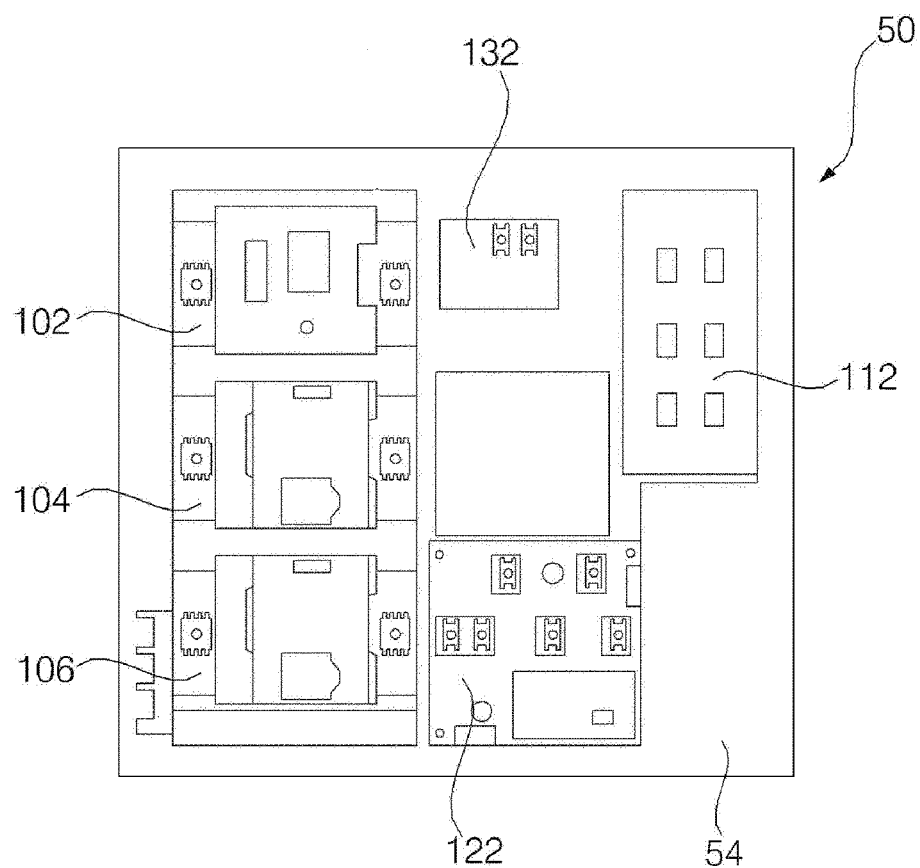
FIG. 6 is a plan view illustrating heating part receipt boards of the driving module for vehicles in accordance with the embodiment of the present invention.
Figure 7:
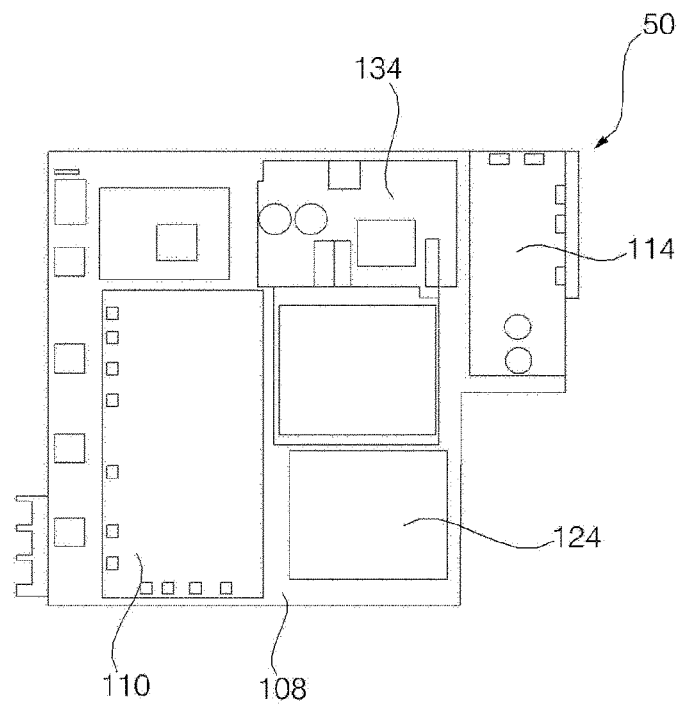
FIG. 7 is a plan view illustrating control boards of the driving module for vehicles in accordance with the embodiment of the present invention.
Figure 8:
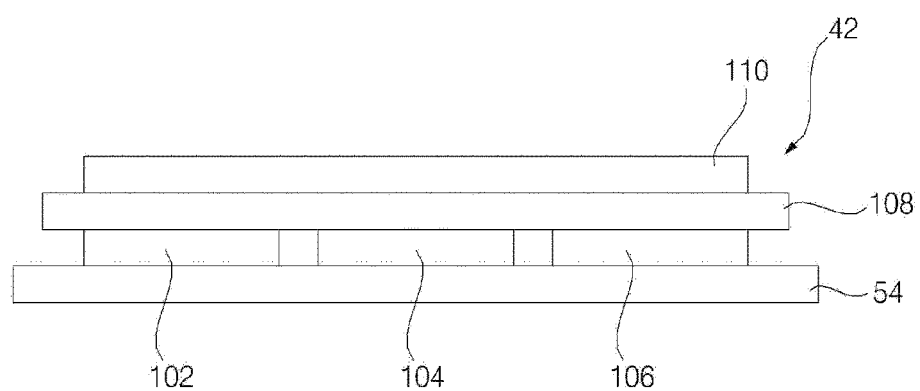
FIG. 8 is a side view illustrating a first power conversion device of the driving module for vehicles in accordance with the embodiment of the present invention.

FIG. 6 is a plan view illustrating heating part receipt boards of the driving module for vehicles in accordance with the embodiment of the present invention. FIG. 7 is a plan view illustrating control boards of the driving module for vehicles in accordance with the embodiment of the present invention. FIG. 8 is a side view illustrating the first power conversion device of the driving module for vehicles in accordance with the embodiment of the present invention.

The first power conversion device 42, the second power conversion device 44, the third power conversion device 46 and the fourth power conversion device 48 may include heating part receipt boards 102, 104, 106, 112, 122 and 132 on which heating parts are safely received. The heating part receipt boards 102, 104, 106, 112, 122 and 132 of the first power conversion device 42, the second power conversion device 44, the third power conversion device 46 and the fourth power conversion device 48 may be disposed together on one cooling module 54 so as to be cooled.

The first power conversion device 42, the second power conversion device 44, the third power conversion device 46 and the fourth power conversion device 48 may further include control boards 110, 114, 124 and 134 to control the heating part receipt boards 102, 104, 106, 112, 122 and 132.

The CPU 52 of the integrated control module 50 shown in FIG. 5 may perform integrated control of the control boards 110, 114, 124 and 134 of the first power conversion device 42, the second power conversion device 44, the third power conversion device 46 and the fourth power conversion device 48.

Each of the first power conversion device 42, the second power conversion device 44, the third power conversion device 46 and the fourth power conversion device 48 may include a power PCB mounted on the cooling module 54 and a control PCB connected to the CPU 52 to control the power PCB.

The first power conversion device 42 may include heating part receipt boards 102, 104 and 106 electrically connected to the vehicle driving motor 10, and a control board 110 electrically connected to the CPU 52 and the heating part receipt boards 102, 104 and 106 to control the heating part receipt boards 102, 104 and 106.

The number of the heating part receipt boards 102, 104 and 106 of the first power conversion device 42 is not one but may be the same as the number of phases of the vehicle driving motor 10.

The first power conversion device 42 may have a plurality of phases and include boards prepared in the same number as the number of the phases so as to correspond to phase shift of the respective phases. The heating part receipt boards 102, 104 and 106 of the first power conversion device 42 may have the same phases as the motor, and the first power conversion device 42 may include boards prepared in the same number as the phases so as to correspond to phase shift of the respective phases.

The first power conversion device 42 may include a first heating part receipt board 102 on which a U-phase power element is installed, a second heating part receipt board 104 on which a V-phase power element is installed, and a third heating part receipt board 106 on which a W-phase power element is installed.

The U-phase power element may be connected to the U-phase winding wire of the vehicle driving motor 10 and include a switch to interrupt current applied to the U-phase winding wire of the vehicle driving motor 10. The V-phase power element may be connected to the V-phase winding wire of the vehicle driving motor 10 and include a switch to interrupt current applied to the V-phase winding wire of the vehicle driving motor 10. The W-phase power element may be connected to the W-phase winding wire of the vehicle driving motor 10 and include a switch to interrupt current applied to the W-phase winding wire of the vehicle driving motor 10.

The first heating part receipt board 102, the second heating part receipt board 104 and the third heating part receipt board 106 may constitute a motor power board to apply power to the vehicle driving motor 10. The first heating part receipt board 102, the second heating part receipt board 104 and the third heating part receipt board 106 may be separated from one another on the upper surface of the cooling module 54. The first heating part receipt board 102, the second heating part receipt board 104 and the third heating part receipt board 106 may be connected by a bus bar.

If the first power conversion device 42 were formed as a single power board in which the U-phase power element, the V-phase power element and the W-phase power element are installed on one PCB, and then if one of the U-phase power element, the V-phase power element and the W-phase power element is damaged due to damage to a circuit caused by overcurrent, the entirety of the single power board would need to be replaced or serviced for repair.

On the other hand, if, as in the present invention, the three heating part receipt boards 102, 104 and 106 are separated from one another and constitute the motor power board, only the heating part receipt board of a damaged power element may be replaced and, thus, service costs may be reduced.

The integrated control module 50 may further include a board cover 108 covering the upper surfaces of the three heating part receipt boards 102, 104 and 106. The board cover 108 may be formed in a plate type of a synthetic resin.

The control board 110 of the first power conversion device 42 may be electrically connected to the first heating part receipt board 102, the second heating part receipt board 104 and the third heating part receipt board 106, and thus control all of the first heating part receipt board 102, the second heating part receipt board 104 and the third heating part receipt board 106.

The control board 110 of the first power conversion device 42 may be prepared in a smaller number than the number of the heating part receipt boards 102, 104 and 106 of the first power conversion device 42. The control board 110 of the first power conversion device 42 may be disposed on the upper surface of the board cover 108.

The second power conversion device 44 may include a heating part receipt board 112 electrically connected to the compressor 30, and a control board 114 electrically connected to the heating part receipt board 112 of the second power conversion device 44 and the CPU 52 to control the heating part receipt board 112 of the second power conversion device 44.

The heating part receipt board 112 of the second power conversion device 44 may be separated from the heating part receipt boards 102, 104 and 106 of the first power conversion device 42 on the upper surface of the cooling module 54.

The control board 114 of the second power conversion device 44 may be separated from the control board 110 of the first power conversion device 42 on the upper surface of the board cover 108.

The third power conversion device 46 may include a heating part receipt board 122 electrically connected to the high voltage battery HB, and a control board 124 electrically connected to the heating part receipt board 122 of the third power conversion device 46 and the CPU 52 to control the heating part receipt board 122 of the third power conversion device 46.

The fourth power conversion device 48 may include a heating part receipt board 132 electrically connected to the low voltage battery LB, and a control board 134 electrically connected to the heating part receipt board 132 of the fourth power conversion device 48 and the CPU 52 to control the heating part receipt board 132 of the fourth power conversion device 48.

The heating part receipt board 132 of the fourth power conversion device 48 may be separated from the heating part receipt boards 102, 104 and 106 of the first power conversion device 42 and the heating part receipt board 112 of the second power conversion device 44 on the upper surface of the cooling module 54.

The control board 134 of the fourth power conversion device 48 may be disposed on the upper surface of the board cover 108.

In the integrated control module 50, the heating part receipt boards 102, 104, 106, 112, 122 and 132 may be disposed on the cooling module 54, the control boards 110, 114, 124 and 134 may be disposed on the heating part receipt boards 102, 104, 106, 112, 122 and 132, and the CPU 52 may be disposed on the control boards 110, 114, 124 and 134.

Figure 9:
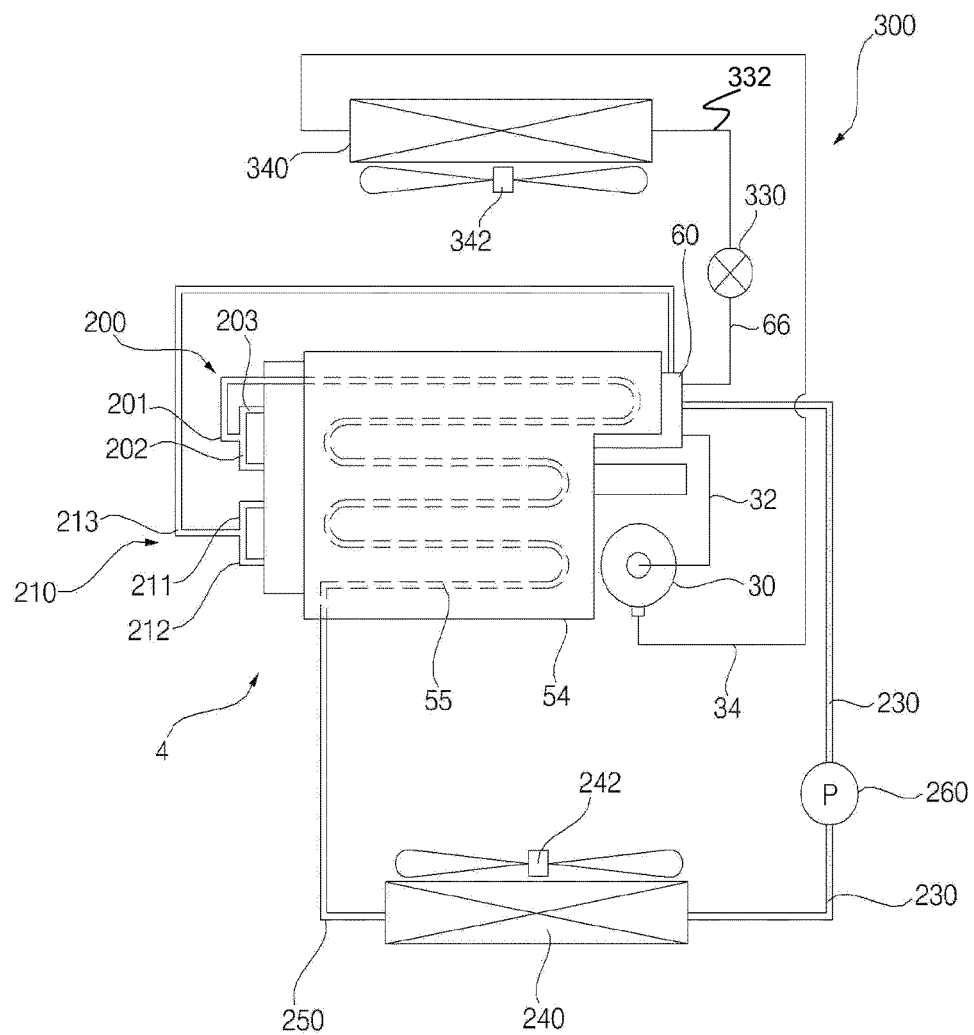
FIG. 9 is a view schematically illustrating the driving module for vehicles in accordance with the embodiment of the present invention and an indoor heat exchanger and a radiation unit thereof.
Figure 10:
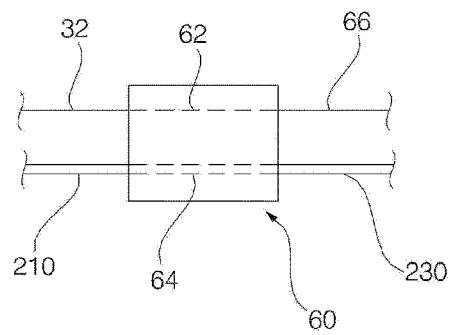
FIG. 10 is a view illustrating a heat exchanger of the driving module for vehicles in accordance with the embodiment of the present invention.
Figure 11:
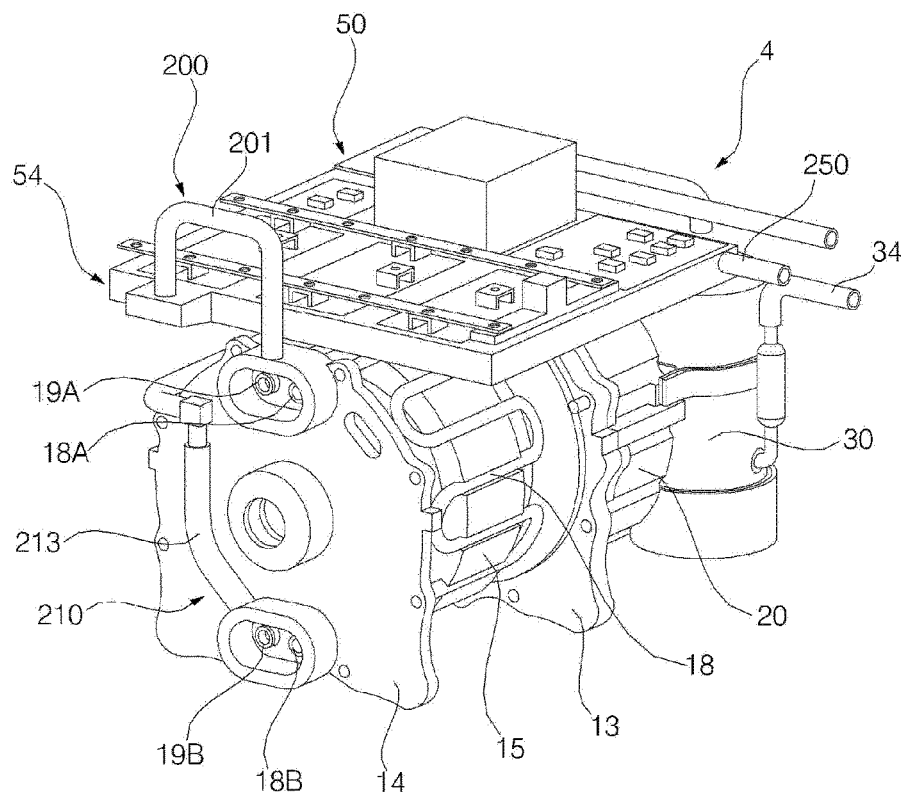
FIG. 11 is a perspective view illustrating the driving module for vehicles in accordance with the embodiment of the present invention, from which a motor housing is removed.
Figure 12:
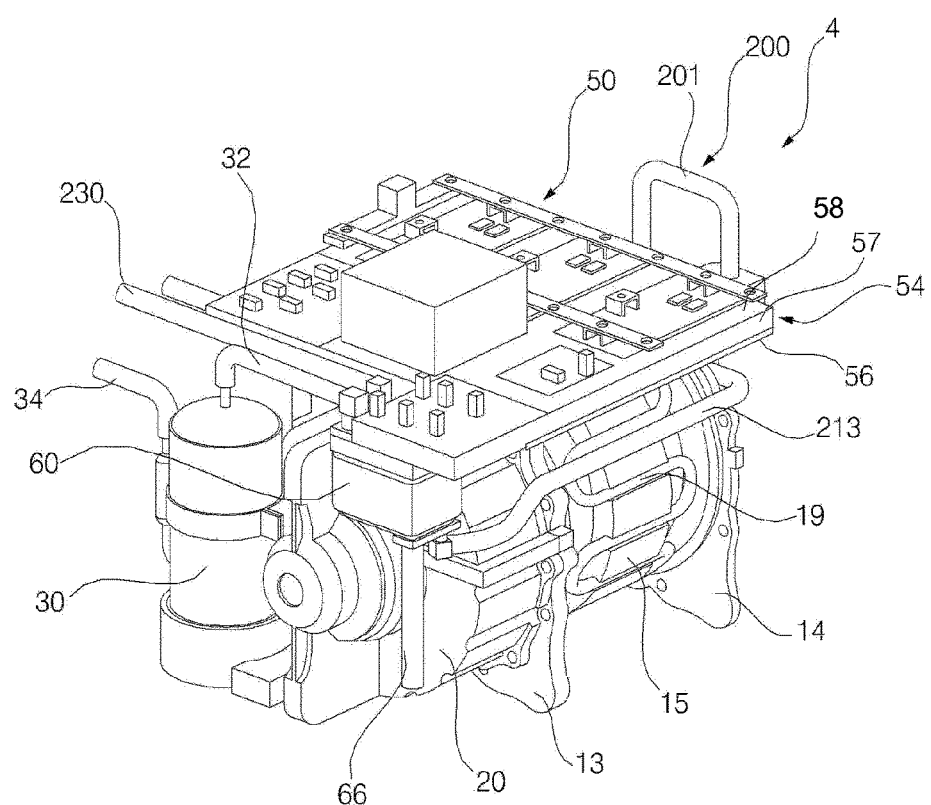
FIG. 12 is a perspective view illustrating the driving module for vehicles in accordance with the embodiment of the present invention, as seen from a different direction from the direction of FIG. 11.

FIG. 9 is a view schematically illustrating the driving module for vehicles in accordance with the embodiment of the present invention and an indoor heat exchanger and a radiation unit thereof. FIG. 10 is a view illustrating a heat exchanger of the driving module for vehicles in accordance with the embodiment of the present invention. FIG. 11 is a perspective view illustrating the driving module for vehicles in accordance with the embodiment of the present invention, from which a motor housing is removed. FIG. 12 is a perspective view illustrating the driving module for vehicles in accordance with the embodiment of the present invention, as seen from a different direction from the direction of FIG. 11.

A cooling module cooling channel 55, through which cooling water passes, may be formed in the cooling module 54.

The cooling module cooling channel 55 may be formed in a zigzag shape within the cooling module 54. The cooling module cooling channel 55 may include one inlet channel part into which cooling water is introduced, a plurality of branch channel parts branched off from the inlet channel part, and one outlet channel part to which the plurality of branch channel parts are connected and through which the cooling water exits.

In the cooling module 54, the cooling module cooling channel 55 may be formed between an upper plate 58 and a lower plate 56. The cooling module 54 may further include an intermediate plate 57 disposed between the upper plate 58 and the lower plate 56, and the cooling channel may be formed in the intermediate plate 57. The cooling module cooling channel 55 may be an endothermic channel through which cooling water passes to absorb surrounding heat. The upper plate 58 or the intermediate plate 57 of the cooling module 54 may function as a heat sink. A fin to improve heat transfer performance may be formed on the upper plate 58 or the intermediate plate 57. The intermediate plate 57 may be integrated with one of the upper plate 58 and the lower plate 56, or be manufactured separately from the upper plate 58 and the lower plate 56 and then combined with the upper plate 58 and the lower plate 56.

Motor cooling channels 18 and 19 through which cooling water passes may be formed in the vehicle driving motor 10.

The motor cooling channels 18 and 19 may be formed by cooling pipes disposed within the vehicle driving motor 10 such that the cooling water passes through the cooling pipes.

A plurality of motor cooling channels 18 and 19 may be formed within the vehicle driving motor 10. In the vehicle driving motor 10, as exemplarily shown in FIG. 11, a first cooling pipe contacting a part of the stator 15 may form a first motor cooling channel 18.

In the vehicle driving motor 10, as exemplarily shown in FIG. 12, a second cooling pipe disposed symmetrically with the first cooling pipe opposite to the first cooling pipe may form a second motor cooling channel 19.

The first motor cooling channel 18 and the second motor cooling channel 19 may divisionally cool the inner space of the vehicle driving motor 10.

A first inlet terminal 18A of the first cooling pipe into which cooling water is introduced may be located at the upper portion of the vehicle driving motor 10. A first outlet terminal 18B of the first cooling pipe from which the cooling water exits may be located at the lower portion of the vehicle driving motor 10.

The first inlet terminal 18A may be disposed at the upper portions of the gear box 20 and the second side cover 14 from among the first and second side covers 13 and 14 of the vehicle driving motor 10. The first outlet terminal 18B may be disposed at the lower portions of the gear box 20 and the second side cover 14 from among the first and second side covers 13 and 14 of the vehicle driving motor 10.

A second inlet terminal 19A of the second cooling pipe into which the cooling water is introduced may be located at the upper portion of the vehicle driving motor 10. A second outlet terminal 19B of the second cooling pipe from which the cooling water exits may be located at the lower portion of the vehicle driving motor 10.

The second inlet terminal 19A may be disposed at the upper portions of the gear box 20 and the second side cover 14 from among the first and second side covers 13 and 14 of the vehicle driving motor 10. The second outlet terminal 19B may be disposed at the lower portions of the gear box 20 and the second side cover 14 from among the first and second side covers 13 and 14 of the vehicle driving motor 10.

One cooling channel may be extended within the vehicle driving motor 10 but, in this case, loss of pressure when cooling water flows may increase.

On the other hand, if two motor cooling channels 18 and 19 branched into the first motor cooling channel 18 and the second motor cooling channel 19 are installed within the vehicle driving motor 10, loss of pressure when cooling water flows may be minimized.

The cooling module cooling channel 55 and the motor cooling channels 18 and 19 may be connected by a cooling module-motor connection channel 200.

One end of the cooling module-motor connection channel 200 may be connected to the cooling module 54, as exemplarily shown in FIGS. 9 and 11. The other end of the cooling module-motor connection channel 200 may be connected to the vehicle driving motor 10. The cooling module-motor connection channel 200 may guide the cooling water, having passed through the cooling module cooling channel 55, to the motor cooling channels 18 and 19.

The cooling module-motor connection channel 200 may include one common channel part 201 extending from the cooling module 54 and a pair of branch channel parts 202 and 203 branched from the common channel part 201, as exemplarily shown in FIG. 9. The cooling module-motor connection channel 200 may be formed by one pipe and two branch pipes branched from the one pipe. One 202 of the pair of branch channel parts 202 and 203 may be connected to the first inlet terminal 18A shown in FIG. 11 and the other 203 of the pair of branch channel parts 202 and 203 may be connected to the second inlet terminal 19A shown in FIG. 11.

The vehicle may further include a motor-heat exchanger connection channel 210 to guide the cooling water having cooled the vehicle driving motor 10.

The motor-heat exchanger connection channel 210 may be a motor exit water channel through which cooling water heated by the vehicle driving motor 10 passes prior to introduction into the heat exchanger 60.

The motor-heat exchanger connection channel 210 may include a first branch channel part 211 connected to the first outlet terminal 18B shown in FIG. 11, a second branch channel part 212 connected to the second outlet terminal 19B shown in FIG. 11, and one common channel part 213 into which the first branch channel part 211 and the second branch channel part 212 are joined. The motor-heat exchanger connection channel 210 may be formed by two branch pipes and one joined pipe into which the two branch pipes are joined.

The motor-heat exchanger connection channel 210 may be connected to the heat exchanger 60 and guide cooling water to the heat exchanger 60. The motor-heat exchanger connection channel 210 may connect the motor cooling channels 18 and 19 to a cooling water channel 64 of the heat exchanger 60, which will be described later.

Cooling water, having cooled the vehicle driving motor 10, may be introduced into the cooling water channel 64 of the heat exchanger 60 through the motor-heat exchanger connection channel 210, heated by the cooling water channel 64 and then guided to a heat exchanger exit water channel 230.

Cooling water, having passed through the inside of the vehicle driving motor 10, may be joined in the motor-heat exchanger connection channel 210 and absorb heat from the refrigerant having a relatively high temperature within the heat exchanger 60.

The heat exchanger 60 may include the heat exchanger exit water channel 230 to guide cooling water, the temperature of which is increased via the heat exchanger 60.

The heat exchanger 60 may exchange heat between cooling water, having cooled the cooling module cooling channel 55 and the motor cooling channels 18 and 19, and the refrigerant compressed by the compressor 30.

The heat exchanger 60 may be connected to a radiation unit 240 to radiate heat from the cooling water having exchanged heat with the refrigerant.

The radiation unit 240 may be an air cooling-type radiator which radiates heat from the cooling water exiting the heat exchanger exit water channel 230. The vehicle may further include a radiation unit exit water channel 250 to guide cooling water exiting the radiation unit 240 back to the cooling module cooling channel 55 of the cooling module 54.

Here, the radiation unit 240 may be a cooling water radiating heat exchanger installed at the outside of the driving module 4 and radiate heat from the cooling water between the heat exchanger 60 and the cooling module 54 in the flow direction of the cooling water.

The vehicle may include an outdoor fan 242 to blow outdoor air to the radiation unit 240. When the outdoor fan 242 is driven, outdoor air may flow into the radiation unit 240 and thus more rapidly cool the cooling water.

The vehicle may further include a cooling water pump 260 installed on at least one of the heat exchanger exit water channel 230 and the radiation unit exit water channel 250.

When the cooling pump 260 is driven, cooling water may pass through the cooling module 54 and primarily absorb heat from the integrated control module 50, and then pass through the vehicle driving motor 10 and absorb heat from the vehicle driving motor 10. The cooling water may sequentially cool the integrated control module 50 and the vehicle driving motor 10, absorb heat from the heat exchanger 60, radiate heat in the radiation unit 240 and be cooled. The cooling water having been cooled by the radiation unit 240 may be again introduced into the cooling module 54. The cooling water may repeat the above-described process, thus repeating absorption and radiation of heat.

The heat exchanger 60 may include a refrigerant channel 62 through which the refrigerant compressed by the compressor 30 passes, and a cooling water channel 64 in which cooling water absorbs heat from the refrigerant of the refrigerant channel 62.

The vehicle in which the driving module 4 is mounted may include a refrigerating cycle device 300 including the compressor 30 and the heat exchanger 60, and the refrigerating cycle device 300 may further include an expansion unit 330 to expand the refrigerant, and an indoor heat exchanger 340 to exchange heat between the refrigerant and indoor air.

The compressor 30 may be connected to the heat exchanger 60 by a compressor discharge channel 32. The compressor 30 may be connected to the indoor heat exchanger 340 by a compressor suction channel 34. When the compressor 30 is driven, the compressor 30 may suck the refrigerant into the compressor suction channel 34, compress the refrigerant, and discharge the compressed refrigerant to the compressor discharge channel 32. The compressor discharge channel 32 may be connected to the refrigerant channel 62 of the heat exchanger 60.

The refrigerant, compressed by the compressor 30 and discharged to the compressor discharge channel 32, may pass through the refrigerant channel 62 of the heat exchanger 60 and lose heat to the cooling water of the cooling water channel 64. While the refrigerant passes through the cooling water channel 64 of the heat exchanger 60, the refrigerant may be condensed. The heat exchanger 60 may be connected to the expansion unit 330 by an expansion unit connection channel 66, and the refrigerant condensed by the refrigerant channel 62 may flow to the expansion unit 330 and be expanded by the expansion unit 330.

The expansion unit 330 may include a capillary tube or an electronic expansion valve to expand the refrigerant. The expansion unit 330 may be connected to the indoor heat exchanger 340 by a connection channel 332, and the refrigerant expanded by the expansion unit 330 may flow through the indoor heat exchanger 340 via the connection channel 332.

The indoor heat exchanger 340 may include a refrigerant channel through which the refrigerant passes, and be connected to the compressor suction channel 34. When the refrigerant passes through the indoor heat exchanger 340, the refrigerant may exchange heat with indoor air, absorb heat from the indoor air and thus be evaporated. The refrigerant evaporated by the indoor heat exchanger 340 may flow to the compressor suction channel 34 and be sucked into the compressor 30. The vehicle may further include an indoor fan 342 to blow indoor air to the indoor heat exchanger 340.

The components of the refrigerating cycle device 300 which occupy the greatest volume are the heat exchanger 60 to condense the refrigerant and the indoor heat exchanger 340 to evaporate the refrigerant. The plate-type heat exchanger 60 is mounted in a vacant space of the driving module 4 and, thus, space utilization may be improved. Further, the compressor 30 and the heat exchanger 60 become parts of the driving module 4 and, thus, the pipe length of the refrigerant discharge channel 32 between the compressor 30 and the heat exchanger 60 may be minimized and a piping work time may be shortened.

Figure 13:
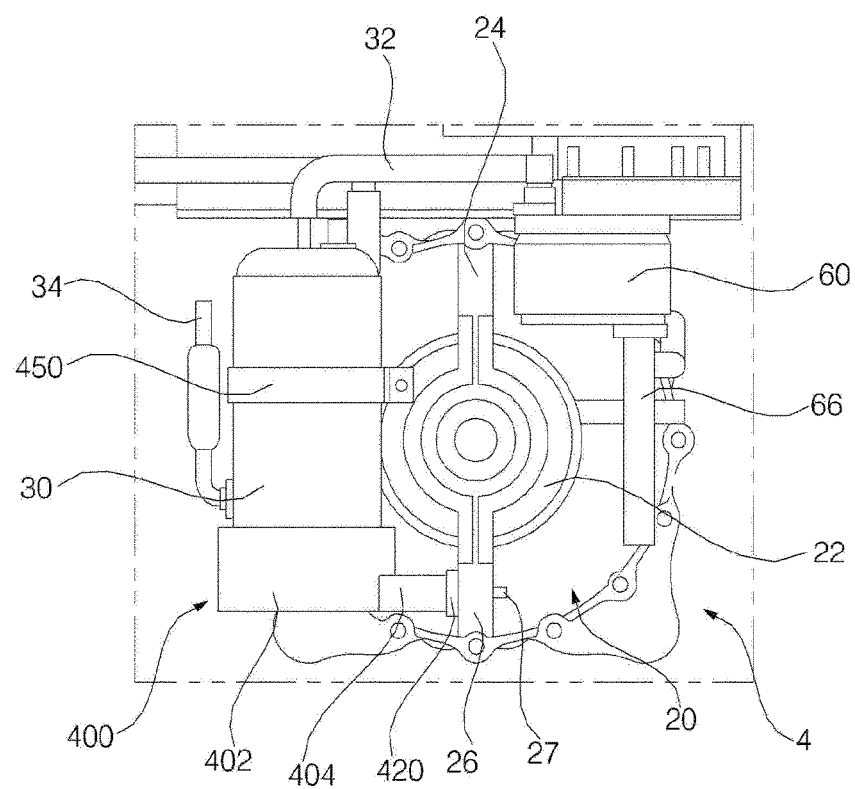
FIG. 13 is a side view of a vehicle interior air conditioning compressor and a gear box of the driving module for vehicles in accordance with the embodiment of the present invention.
Figure 14:
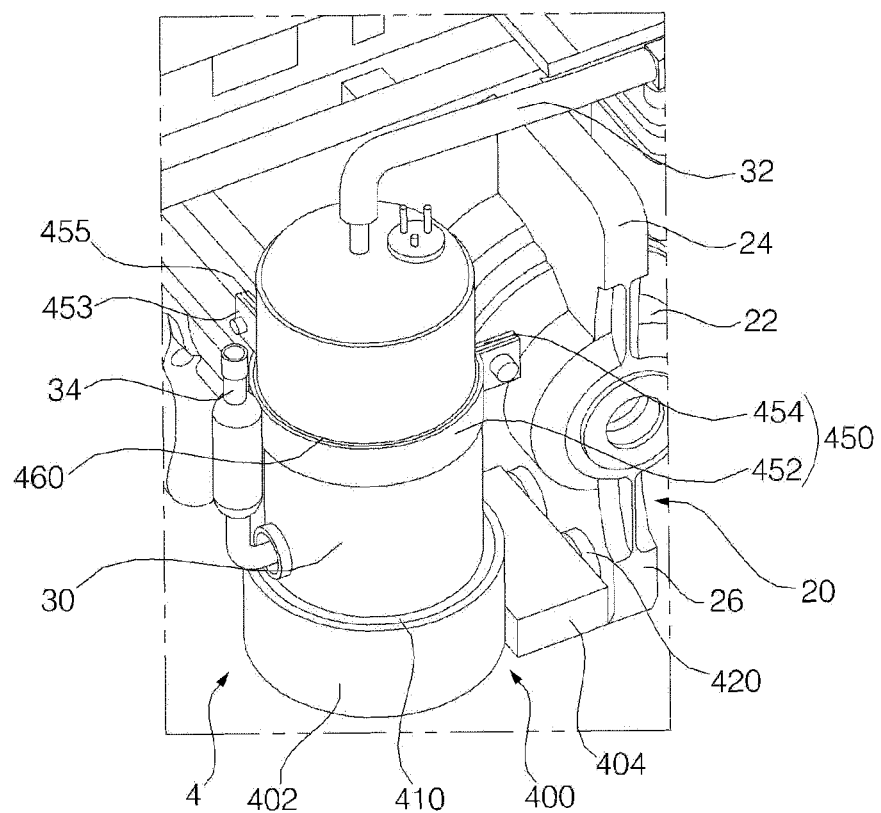
FIG. 14 is an enlarged view of the vehicle interior air conditioning compressor and the gear box of the driving module for vehicles in accordance with the embodiment of the present invention.

FIG. 13 is a side view of the vehicle interior air conditioning compressor and the gear box of the driving module for vehicles in accordance with the embodiment of the present invention. FIG. 14 is an enlarged view of the vehicle interior air conditioning compressor and the gear box of the driving module for vehicles in accordance with the embodiment of the present invention.

The driving module 4 may include a first compressor holder 400 mounted on the case 5 to restrict vertical movement of the compressor 30.

The compressor 30 may be placed on the first compressor holder 400, and the first compressor holder 400 may be a structure on which the compressor 30 is seated. The first compressor holder 400 may include a cylindrical part 402. A space into which the lower portion of the compressor 30 may be inserted may be formed within the cylindrical part 402. The upper surface of the cylindrical part 402 may be opened and the lower surface of the cylindrical part 402 may be closed. The lower portion of the compressor 30 may be inserted into the cylindrical part 402 from the top.

The first compressor holder 400 may be mounted on the gear box 20. The first compressor holder 400 may include a coupling part 404 coupled with the gear box 20. The coupling part 404 may protrude from the cylindrical part 402 toward the gear box 20. The coupling part 404 may be a protrusion protruding from one side of the cylindrical part 404 in parallel toward the gear box 20. The first compressor holder 400 may be formed of an elastic material.

Further, the gear box 20 may include a lower protrusion 26 formed at the lower portion of the differential gear device case 22. The lower protrusion 26 may protrude in the longitudinal direction. The lower protrusion 26 may protrude in the vertical direction. At least a part of the lower protrusion 26 may protrude opposite the first compressor holder 400. The first compressor holder 400 may be coupled with the lower protrusion 26. A through hole 27, through which a coupling member, such as a screw, passes, may be formed on the lower protrusion 26, and the coupling member, such as a screw, may pass through the lower protrusion 26 and be coupled with the first compressor holder 400.

The driving module 4 may further include a case elastic member 420 disposed between the first compressor holder 400 and the case 5. The first compressor holder 400 may be formed of a metal, and the case elastic member 420 may be disposed between the first compressor holder 400 formed of a metal and the gear box 20. The case elastic member 420 may be an anti-vibration member installed between the coupling part 404 of the first compressor holder 400 and the gear box 20. The case elastic member 420 may be an anti-vibration member formed of an elastic material, such as rubber. The case elastic member 420 may be a rubber bushing and minimize propagation of vibration.

The driving module 4 may include a second compressor holder 450 mounted on the case 5 to restrict horizontal movement of the compressor 30.

The second compressor holder 450 may surround a part of the outer circumference of the compressor 30. The second compressor holder 450 may surround the outer circumference of the compressor 30 at a higher position than the first compressor holder 400. The second compressor holder 450 may be mounted on the gear box 20. The second compressor holder 450 may include a first band 452 surrounding a part of the outer circumference of the compressor 30 and a second band 454 combined with the first band 452. First coupling parts 453 bent and provided with through holes, through which a coupling member, such as a screw, passes, may be formed on the first band 452, and second coupling parts 455 disposed opposite to the first coupling parts 453, bent and provided with through holes, through which a coupling member, such as a screw, passes, may be formed on the second band 454. The first coupling parts 453 may be formed at both ends of the first band 452, and the second coupling parts 455 may be formed at both ends of the second band 454. Coupling members, such as screws, may pass through the first coupling parts 453 and the second coupling parts 455 and be coupled with coupling bosses formed on the gear box 20. The second compressor holder 450 may be formed of an elastic material.

The driving module 4 may further include a case elastic member disposed between the second compressor holder 450 and the case 5. The second compressor holder 450 may be formed of a metal and the case elastic member between the second compressor holder 450 and the case 5 may be disposed between the second compressor holder 450 formed of a metal and the case 5. The case elastic member between the second compressor holder 450 and the case 5 may be an anti-vibration member installed between the second compressor holder 450 and the case 5. The case elastic member between the second compressor holder 450 and the case 5 may be an anti-vibration member formed of an elastic material, such as rubber. The case elastic member between the second compressor holder 450 and the case 5 may be a rubber bushing and minimize propagation of vibration.

The driving module 4 may further include elastic members 410 and 460 to prevent damage to the compressor 30 or to reduce vibration and noise.

The elastic members 410 and 460 may include a first elastic member 410 disposed between the first compressor holder 400 and the compressor 30.

The first compressor holder 400 may be formed of a metal and the first elastic member 410 may be disposed between the outer circumferential surface of the compressor 30 and the inner circumferential surface of the cylindrical part 402. The first elastic member 410 may be disposed in a ring shape along the inner circumferential surface of the cylindrical part 402. The inner circumferential surface of the first elastic member 410 may contact the outer circumferential surface of the compressor 30, and the outer circumferential surface of the first elastic member 410 may contact the inner circumferential surface of the cylindrical part 402. The first elastic member 410 may be attached to the inner circumferential surface of the cylindrical part 402 by an adhesive. The first elastic member 410 may be an anti-vibration member formed of an elastic material, such as rubber, and minimize propagation of vibration.

The elastic members 410 and 460 may include a second elastic member 460 disposed between the outer circumferential surface of the compressor 30 and the second compressor holder 450.

The second compressor holder 450 may be formed of a metal and the second elastic member 460 may be disposed between the outer circumferential surface of the compressor 30 and the inner circumferential surface of the second compressor holder 450. The second elastic member 460 may be disposed in a ring shape along the inner circumferential surface of the second compressor holder 450. The inner circumferential surface of the second elastic member 460 may contact the outer circumferential surface of the compressor 30, and the outer circumferential surface of the second elastic member 460 may contact the inner circumferential surface of the second compressor holder 450. The second elastic member 460 may be attached to the inner circumferential surface of the second compressor holder 450 by an adhesive. The second elastic member 460 may be an anti-vibration member formed of elastic foam, such as rubber, and minimize propagation of vibration.

Figure 15:
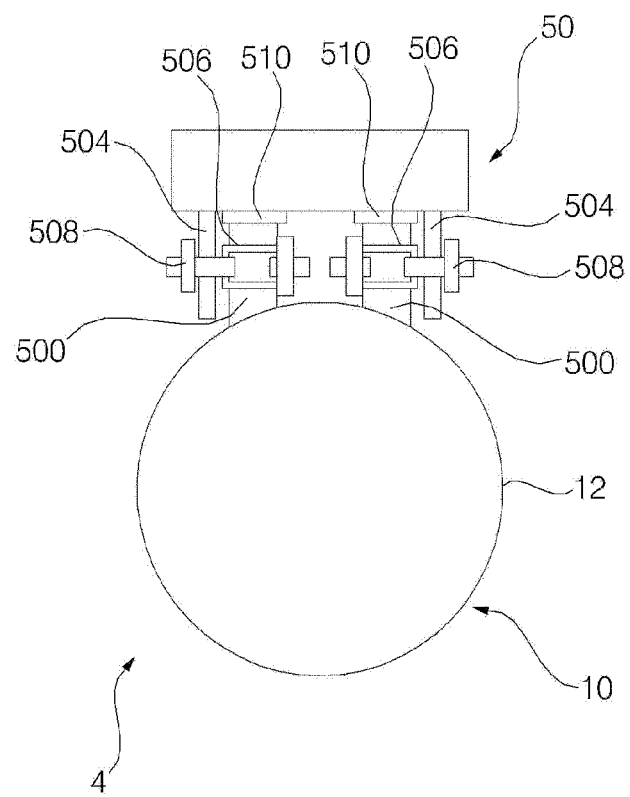
FIG. 15 is a view illustrating combination between a motor and an integrated control module of the driving module for vehicles in accordance with the embodiment of the present invention.

FIG. 15 is a view illustrating combination between the motor and the integrated control module of the driving module for vehicles in accordance with the embodiment of the present invention.

The vehicle driving motor 10 may include fixing units 500 to fix the integrated control module 50. The fixing units 500 may protrude from the upper portion of the vehicle driving motor 10 in the upward direction. At least one fixing unit 500 may be formed at the upper portion of the vehicle driving motor 10. The fixing units 500 may protrude integrally from the motor housing 12.

The upper ends of the fixing units 500 may be opposite the integrated control module 50. The upper ends of the fixing units 500 are not pointed but may be planar so that the integrated control module 50 may be placed on the upper ends of the fixing units 500.

Anti-vibration bushings 506 may be mounted on the fixing units 500. The anti-vibration bushings 506 may penetrate the fixing units 500.

The integrated control module 50 may be disposed above the vehicle driving motor 10. The integrated control module 50 may be coupled with the fixing units 500 formed on the vehicle driving motor 10.

The integrated control module 50 may include coupling parts 504 coupled with the vehicle driving motor 10. The coupling parts 504 may protrude from the lower portion of the integrated control module in the downward direction. Portions of the coupling parts 504 may be opposite the fixing parts 500. The coupling parts 504 may be coupled with the anti-vibration bushings 506 by coupling members 508, such as screws. The coupling members 508 may pass through holes formed on the coupling parts 504 and be coupled with the anti-vibration bushings 506. The anti-vibration bushings 506 may prevent propagation of vibration through the fixing units 500 and the coupling parts 504. The anti-vibration bushings 506 may be formed of an elastic material, such as rubber or gel.

The driving module 4 may include integrated control module elastic members 510 disposed between the fixing units 500 and the integrated control module 50.

The lower surfaces of the integrated control module elastic members 510 may be placed on the upper surfaces of the fixing units 500, and the upper surfaces of the integrated control module elastic members 510 may contact the lower surface of the integrated control module 50. The integrated control module elastic members 510 may be rubber pads intercepting vibration between the vehicle driving motor 10 and the integrated control module 50. The integrated control module elastic members 510 may be formed of an elastic material, such as rubber or gel.

Figure 16:
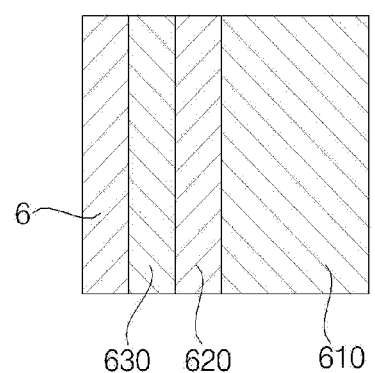
FIG. 16 is a cross-sectional view illustrating a part of the integrated control module case of the driving module for vehicles in accordance with the embodiment of the present invention.

FIG. 16 is a cross-sectional view illustrating a part of the integrated control module case of the driving module for vehicles in accordance with the embodiment of the present invention.

One or more conductor layers having a thickness of 10 nm to 3 mm may be formed on at least one of the inner surface and the outer surface of the integrated control module case 6 so that the integrated control module case 6 may have electromagnetic wave absorption and shielding performance corresponding to the first power conversion device, the second power conversion device, the third power conversion device and the fourth power conversion device, and a sound absorbent and/or a sound insulation material may be further provided thereon.

A conductor layer 630 formed of aluminum foil, having a thickness of 10 nm to 3 mm and blocking electromagnetic interference (EMI) or electromagnetic compatibility (EMC) may be disposed on the integrated control module case 6. A sound insulation layer 620 may be applied to the conductor layer 630. The sound insulation layer 620 may be formed of rubber. A sound absorbent layer 610 may be applied to the sound insulation layer 620. The sound absorbent layer 610 may be formed of a sponge.

As apparent from the above description, a driving module for vehicles in accordance with one embodiment of the present invention may be compact, increase space utilization in a vehicle, and minimize the number or parts and the number of assembly processes.

Further, serviceability may be improved and service costs may be reduced.

Further, a pipe length between a vehicle interior air conditioning compressor and a heat exchanger may be minimized, and pipe work may be simplified.

Further, transmission of vibration between the vehicle interior air conditioning compressor and a vehicle driving motor may be minimized.

Moreover, transmission of vibration of the vehicle driving motor to an integrated control module may be minimized and, thus, damage to the integrated control module by vibration may be minimized and reliability may be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A driving module for a vehicle, comprising:
   a vehicle driving motor configured to produce a rotary force;
   a gear device configured to transmit the rotary force of the vehicle driving motor;
   a case configured to accommodate the vehicle driving motor and the gear device;
   a vehicle interior air conditioning compressor mounted to the case; and
   an integrated control module mounted to the case, the integrated control module including:
      a first power conversion device configured to drive the vehicle driving motor; and
      a second power conversion device configured to drive the vehicle interior air conditioning compressor,
      wherein the first power conversion device and the second power conversion device are integrated into the integrated control module,
      wherein the first power conversion device has a number of phases, and
      wherein the first power conversion device includes a same number of boards to correspond to a phase shift of the respective phases.

2. The driving module for a vehicle according to claim 1, wherein the integrated control module further includes a third power conversion device configured to charge a high voltage battery of the vehicle.

3. The driving module for a vehicle according to claim 2, wherein the integrated control module further includes a fourth power conversion device configured to charge a low voltage battery of the vehicle with electrical energy from the high voltage battery of the vehicle.

4. The driving module for a vehicle according to claim 3, wherein the third power conversion device includes a power conversion circuit unit connected to at least one of the first power conversion device, the second power conversion device and the fourth power conversion device, and
   wherein the power conversion circuit unit is usable during driving of the vehicle.

5. The driving module for a vehicle according to claim 4, wherein the third power conversion device is configured to charge the high voltage battery when in a first mode, and is configured to deliver power for functions other than charging of the high voltage battery when in a second mode.

6. The driving module for a vehicle according to claim 4, wherein the third power conversion device is configured to operate with any one of the first power conversion device, the second power conversion device and the fourth power conversion device when the third power conversion device is not being utilized to charge the high voltage battery.

7. The driving module for a vehicle according to claim 4, wherein the power conversion circuit unit of the third power conversion device is connected to the fourth power conversion device.

8. The driving module for a vehicle according to claim 3, wherein at least one of the first power conversion device, the second power conversion device and the fourth power conversion device is disposed adjacent to the third power conversion device.

9. The driving module for a vehicle according to claim 3, further comprising a cooling module,
   wherein each of the first power conversion device, the second power conversion device, the third power conversion device and the fourth power conversion device includes a heating part receipt board, and
   wherein the heating part receipt boards of the first power conversion device, the second power conversion device, the third power conversion device and the fourth power conversion device are disposed on the cooling module.

10. The driving module for a vehicle according to claim 9, further comprising a heat exchanger configured to absorb heat from at least one of the cooling module and the vehicle driving motor, and to absorb heat from a refrigerant compressed by the vehicle interior air conditioning compressor,
    wherein the heat exchanger is mounted to at least one of the vehicle driving motor, the case, and the cooling module.

11. The driving module for a vehicle according to claim 10, wherein the cooling module includes a cooling module cooling channel through which cooling water of the heat exchanger passes,
    wherein the vehicle driving motor includes a motor cooling channel through which the cooling water passes,
    wherein the cooling module cooling channel and the motor cooling channel are connected by a cooling module-motor connection channel, and
    wherein the heat exchanger is configured to connect to a radiation unit to radiate heat from the cooling water having exchanged heat with the refrigerant.

12. The driving module for a vehicle according to claim 9, wherein each of the first power conversion device, the second power conversion device, the third power conversion device and the fourth power conversion device includes a control board to control the heating part receipt boards thereof, and
    wherein the integrated control module further includes a central processing unit (CPU) to perform integrated control of the control boards of the first power conversion device, the second power conversion device, the third power conversion device and the fourth power conversion device.

13. The driving module for a vehicle according to claim 12, wherein the heating part receipt boards are seated on the cooling module, the control boards are disposed above the heating part receipt boards, and the CPU is disposed above the control boards.

14. The driving module for a vehicle according to claim 3, wherein the integrated control module further includes a central processing unit (CPU) to perform integrated control of the first power conversion device, the second power conversion device, the third power conversion device and the fourth power conversion device, and
    wherein the CPU is disposed above at least one of the first power conversion device, the second power conversion device, the third power conversion device and the fourth power conversion device.

15. The driving module for a vehicle according to claim 1, further comprising:
    a first compressor holder mounted to the case and configured to restrict vertical movement of the vehicle interior air conditioning compressor; and
    a second compressor holder mounted to the case and configured to restrict horizontal movement of the vehicle interior air conditioning compressor.

16. The driving module for a vehicle according to claim 15, wherein at least one of the first compressor holder and the second compressor holder is formed of an elastic material.

17. The driving module for a vehicle according to claim 15, wherein at least one of the first compressor holder and the second compressor holder is made of metal, and further comprising a case elastic member disposed between the holder made of metal and the case.

18. The driving module for a vehicle according to claim 1, wherein fixing units configured to fix the integrated control module are provided on the vehicle driving motor, and
    wherein integrated control module elastic members are disposed between the fixing units and the integrated control module.

19. The driving module for a vehicle according to claim 1, wherein the integrated control module is disposed on the vehicle driving motor,
    wherein the case includes an integrated control module case configured to protect the integrated control module, and
    wherein the integrated control module case includes:
        one or more conductor layers having a thickness of 10 nm to 3 mm provided on at least one of an inner surface and an outer surface of the integrated control module case, whereby the integrated control module case exhibits electromagnetic wave absorption and shielding performance, and
        a sound absorbent and/or a sound insulation material layer having a greater thickness than the conductor layers.

* * * * *